Patented Oct. 21, 1941

2,259,995

UNITED STATES PATENT OFFICE 2,259,995

BREAKING PETROLEUM EMULSIONS

Charles F. Bonnet, Monrovia, Calif., assignor to American Cyanamid & Chemical Corporation, New York, N. Y., a corporation of Delaware No Drawing. Application January 30, 1941, Serial No. 376,628

5 Claims. (Cl. 252—335)

This invention relates to the breaking or resolution of oil field emulsions of the water-in-oil type by the addition of chemical demulsifying agents thereto. A principal object of the invention resides in the treatment of certain emulsions of this class with a chemical demulsifying agent adapted to be effective for the separation of substantial quantities of water therefrom.

The great majority of oil field emulsions are of the water-in-oil type; that is, they consist of small water droplets surrounded by a continuous oil phase. It is well known that there is a great difference between the stability and difficulty of resolution of emulsions obtained from different oil wells, and sometimes even in emulsions obtained from the same well at different times. The increased difficulty in resolving some of these emulsions has been ascribed to the presence of cyclic compounds in the oil which tend to surround the water droplets and act as emulsion stabilizers. The present invention is directed specifically to the resolution of petroleum emulsions of the water-in-oil type in which this condition exists.

Studies of oil field emulsions of the type found in California lead to the conclusion that the emulsion is stabilized by colloidal micelles which are usually cyclic in character and may be aromatic, cycloparaffinic, naphthenic, mixed aromatic-naphthenic, mixed naphthenic-aliphatic, etc. All these compounds contain rather weak hydrophile groups of the type of —OH or —COOH which cause them to form films surrounding the water droplets at the oil-water interface. They also appear to have relatively strong affinities for positive ions such as sodium ions and may form soap-like compounds with the inorganic salts dissolved in the emulsified water by reason of their polar groups. It is probable that there is no quantitative formation of soap, but more likely there exists at the oil-water interface a dynamic equilibrium of soap, naphthenic acids, mineral salt anions and cations, and hydrogen and hydroxyl ions or groups. This equilibrium appears to be one of the most important factors in the stability and resistance to demulsification of emulsions of the type under consideration.

In order to break emulsions in which a stabilizing film of cyclic compounds exists at the oil-water interface it is necessary to rupture the film by altering its dynamic equilibrium with the salts dissolved in the water. It has been known for many years that all the organic sulfonic acids and their functional derivatives which have the properties of commercial wetting agents are effective to displace at least some of the —COONa and —RONa groups at the interfacial film and, at the same time, to reduce the surface tension of the water droplets, whereby breaking of the emulsion is facilitated.

My present invention relates to the breaking of oil field emulsions by subjecting them to the action of an entirely different class of demulsifying agents; namely, the class of aromatic nitroso compounds selected from the group consisting of nitrosophenols and nitroso aromatic carboxylic acids. I have discovered that the compounds of this class are effective for inducing the resolution of petroleum emulsions of the type described above; that is to say, emulsions which contain cyclic compounds that appear to act as emulsion stabilizers.

Although my invention is not limited to a specific theory of operation, I believe that the surprisingly good properties of the nitrosophenols and nitroso aromatic carboxylic acids as emulsion breakers is due in large measure to the fact that they are acidic organic compounds which appear to have a specific action in disrupting the films of cyclic carbon compounds at the oil-water interface. The various members of this class of compounds have a buffering action in the range between pH 5.5 and pH 7.5, and this appears to be the range where the saponifying effect of sodium ions on the cyclic emulsion stabilizers is at a minimum. Moreover, the fact that my nitroso compounds are themselves derivatives of cyclic hydrocarbons is probably another important factor in their ability to penetrate and disperse the cyclic asphaltines, naphthenic and cycloparaffinic bodies and other emulsion stabilizers that occur naturally in crude petroleum and thus to bring about the resolution of the emulsion.

Representative nitroso aromatic carboxylic acids which may be used in practicing the invention are the various nitroso benzoic acids, such as ortho-, meta- and paranitroso benzoic acids, and their salts, esters and halogen substitution products. Nitrosophenols which may be used include ortho-, meta- and paranitrosophenol, the corresponding nitroso cresols and other alkyl phenols, and the corresponding alkali metal salts and anisols or other ethers. These compounds may be added as such or in solution in benzol, cresol, xylenol or other suitable solvents.

Although the nitroso aromatic compounds of the class described are effective when used as the sole demulsifying agent, I have found as an additional feature of my invention that these compounds will frequently improve the efficiency of demulsifying agents of the surface active type, such as sulfonated glyceride oils of the type of sulfonated castor oil, sulfonated corn oil, sulfonated olive oil, sulfonated soya bean oil, sulfonated linseed oil and the like, as well as sulfonated mineral oils such as mahogany sulfonates. They may also be employed in admixture with compounds of the synthetic detergent and wetting agent type that are known to possess the property of lowering the surface tension of water and aqueous inorganic salt solutions such as alkyl naphthalene sulfonates, esters of sulfopolycarboxylic acids such as sodium dioctyl sulfosuccinate, higher alcohol sulfates, etc. They may also be used in conjunction with or in admixture with other wetting and demulsifying agents such as polyalkyl, aryl or hydroxyaryl naphthalene, mono- or polysulfonic acids and their salts and condensation products, with higher aliphatic or cyclo aliphatic substituted or unsubstituted amines, amides or ketones, or with aldehydes such as formaldehyde or with polyhydric alcohols, or with higher unsaturated or hydroxy fatty acids or their salts, esters or amides. Another class of compounds with which they may be used are the condensation products of alkylene oxides with aliphatic mono- and polycarboxylic acids, either unsulfonated or sulfonated, such as the products obtained by condensing ethylene oxide with stearic or oleic acids followed by sulfonation.

It is well known that the acid character of phenols and aromatic carboxylic acids is increased by the introduction of nitroso groups, and the increase in acidic properties is proportional to the number of nitroso groups introduced. For this reason I prefer to employ compounds which contain a plurality of nitroso groups, such as the trinitrosophenols and trinitrosobenzoic acids, but the corresponding compounds containing 1 or 2 nitroso groups may also be employed. Similar results are obtained with the corresponding homologs; thus, for example, mixtures of various cresols and phenols such as are obtainable from coal tar fractions may be transformed into the corresponding nitroso compounds by reaction with nitrous acid and these are attractive compounds for use in practicing my invention by reason of their relatively low price. Another class of phenols that may be reacted with nitrous acid and used are α and β naphthol. These compounds may be used as such or in the form of their functional derivatives; thus, in the case of nitroso phenols the corresponding alkali metal phenolates or ethers may be employed. The salts and esters of the nitroso substituted aromatic carboxylic acids may be used in place of the free acids if desired, and both classes of compounds may be further substituted as by a halogen, in order to further modify their properties.

The aromatic nitroso compounds of my invention are preferably added to the emulsion as solutions in organic solvents, and any suitable solvent such as alcohol, phenol, cresol, benzol, petroleum spirits may be employed for this purpose. In many cases I have found it desirable to dissolve or blend the aromatic nitroso compounds with sulfonated vegetable oils, such as sulfonated castor oil, and to employ the mixture in the form of an aqueous solution or emulsion. The amount of my demulsifying agent to be employed will vary with the nature of the emulsion to be treated; in general quantities of the order of 100-1000 parts per million are recommended and for most purposes it will be found that concentrations of 200-400 parts per million are satisfactory.

It should be understood that, in the commercial resolution of crude oil field emulsions, complete dehydration of the oil by a chemical demulsifying agent is not always obtained, nor is this always necessary. Accordingly, it should be understood that reference to the "breaking" and "resolution" of oil field emulsions in the foregoing specification and in the following claims is intended to include those cases in which only a partial resolution is obtained, since no single chemical demulsifying agent will bring about complete resolution of all petroleum emulsions.

What I claim is:

1. A process for breaking petroleum emulsions of the water-in-oil type which comprises subjecting the emulsion to the action of a demulsifying agent containing a nitroso aromatic compound selected from the group consisting of nitroso phenols and nitroso aromatic carboxylic acids.

2. A process for breaking petroleum emulsions of the water-in-oil type which consists in subjecting the emulsion to the action of a demulsifying agent containing a nitrosophenol.

3. A process for breaking petroleum emulsions of the water-in-oil type which consists in subjecting the emulsion to the action of a demulsifying agent containing a nitrosophenol and also containing a demulsifying agent of the surface-active type.

4. A process for breaking petroleum emulsions of the water-in-oil type which consists in subjecting the emulsion to the action of a demulsifying agent containing a nitrosophenol and also containing a sulfonated vegetable oil.

5. A process for breaking petroleum emulsions of the water-in-oil type which consists in subjecting the emulsion to the action of a demulsifying agent containing a nitrosophenol and also containing an ester of a sulfopolycarboxylic acid.

CHARLES F. BONNET.